United States Patent
Al-Jindan et al.

(10) Patent No.: US 11,899,034 B2
(45) Date of Patent: Feb. 13, 2024

(54) METHOD AND DEVICE FOR MEASURING FLUID DENSITY

(71) Applicant: SAUDI ARABIAN OIL COMPANY, Dhahran (SA)

(72) Inventors: Jana M. Al-Jindan, Dammam (SA); Mohamed Nabil Noui-Mehidi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 43 days.

(21) Appl. No.: 17/648,364

(22) Filed: Jan. 19, 2022

(65) Prior Publication Data
US 2023/0228660 A1 Jul. 20, 2023

(51) Int. Cl.
*G01N 9/00* (2006.01)
*E21B 49/08* (2006.01)
*E21B 49/10* (2006.01)

(52) U.S. Cl.
CPC ......... *G01N 9/002* (2013.01); *E21B 49/0875* (2020.05); *E21B 49/10* (2013.01); *G01N 2009/004* (2013.01)

(58) Field of Classification Search
CPC .............. G01N 9/002; G01N 2009/004; E21B 49/0875
See application file for complete search history.

(56) References Cited

U.S. PATENT DOCUMENTS

| | | | |
|---|---|---|---|
| 4,930,357 A * | 6/1990 | Thurston | G01F 1/3227 137/833 |
| 5,631,413 A | 5/1997 | Young et al. | |
| 6,758,277 B2 * | 7/2004 | Vinegar | E21B 43/123 166/250.03 |

(Continued)

FOREIGN PATENT DOCUMENTS

WO 2021173893 A1 9/2021

OTHER PUBLICATIONS

"Density Measurement for Quality Monitoring and Process Control", Competence Brochure, Endress+Hauser, Access Date: Jan. 18, 2022, URL: <https://www.be.endress.com/_storage/asset/746815/storage/master/file/2658436/download/CP00024F00EN1310.pdf>, pp. 1-20 (20 pages).

(Continued)

*Primary Examiner* — John Fitzgerald
(74) *Attorney, Agent, or Firm* — Osha Bergman Watanabe & Burton

(57) ABSTRACT

Described is a device for measuring fluid density. The device is a flow meter including a housing with one side configured to mount to a flow conduit and define an outlet flow orifice near one end of the housing. The other side defines an inlet flow orifice near another end of the housing. The housing permits fluid to be introduced into the inlet flow orifice, flow through a flow cavity, and pass from the outlet flow orifice. The flow meter also includes a sensor head near the outlet flow orifice. The sensor head vibrates at a frequency upon introduction of electrical power while in contact with a fluid, (Continued)

detects the vibration frequency of the sensor head, and transmits the detected vibration frequency, which is associated with a density of the fluid. A system and method for determining a fluid density of a fluid using the described device is also disclosed.

16 Claims, 7 Drawing Sheets

(56) References Cited

U.S. PATENT DOCUMENTS

| | | | | |
|---|---|---|---|---|
| 7,317,989 | B2* | 1/2008 | DiFoggio | E21B 49/08 73/152.58 |
| 7,844,401 | B2 | 11/2010 | Reittinger | |
| 8,561,479 | B2* | 10/2013 | Hagedoorn | G01F 1/8409 73/861.355 |
| 9,228,429 | B2 | 1/2016 | DiFoggio et al. | |
| 9,863,222 | B2 | 1/2018 | Morrow et al. | |
| 10,012,077 | B2* | 7/2018 | Xia | E21B 47/017 |
| 10,215,604 | B2* | 2/2019 | Sugiyama | G01F 1/8472 |
| 10,261,005 | B2* | 4/2019 | Xia | G01N 27/725 |
| 10,301,938 | B2 | 5/2019 | Harrison et al. | |
| 10,502,670 | B2 | 12/2019 | Goodbread et al. | |
| 10,927,673 | B2 | 2/2021 | Bouldin et al. | |
| 11,061,158 | B2 | 7/2021 | Gonzalez et al. | |
| 11,066,930 | B2 | 7/2021 | Swett et al. | |
| 11,435,273 | B2* | 9/2022 | LeBlanc | E21B 49/0875 |
| 2009/0120168 | A1 | 5/2009 | Harrison et al. | |
| 2012/0085161 | A1 | 4/2012 | Kumar | |
| 2013/0042698 | A1* | 2/2013 | Mayr | G01F 1/7044 73/861.18 |
| 2013/0063149 | A1 | 3/2013 | Reittinger et al. | |
| 2015/0300894 | A1 | 10/2015 | Robutel et al. | |
| 2016/0070016 | A1 | 3/2016 | Wang et al. | |
| 2020/0041395 | A1 | 2/2020 | Swett et al. | |
| 2020/0088619 | A1 | 3/2020 | Goodbread et al. | |
| 2020/0240889 | A1 | 7/2020 | Lan et al. | |
| 2021/0140311 | A1 | 5/2021 | Deffenbaugh et al. | |

OTHER PUBLICATIONS

"Endress+Hauser introduces Liquiphant M Density Meter", Automation.com, International Society of Automation, Mar. 25, 2010, URL: <https://www.automation.com/en-us/products/product15/endresshauser-introduces-liquiphant-m-density-mete> (5 pages).

Raza, Saqlain and R.P. Chaudhari, "Liquid Density Measurement using Tuning Fork", International Journal of Current Engineering and Technology, INPRESSCO, vol. 5, No. 1, Feb. 2015, pp. 499-502 (4 pages).

"Vibronic point level detection", Endress+Hauser, Access Date: Jan. 18, 2022, URL: <https://www.us.endress.com/en/field-instruments-overview/level-measurement/Vibronic-point-level-detection> (4 pages).

Zhou, Yinqiu, et al., "Studies on a Piezoelectric Cylindrical Transducer for Borehole Dipole Acoustic Measurements", Applied Sciences, MDPI, vol. 11, No. 1036, Jan. 2021, pp. 1-12 (12 pages).

* cited by examiner

METHOD AND DEVICE FOR MEASURING FLUID DENSITY

BACKGROUND

In oil and gas, monitoring the characteristics of a fluid being produced from a well is important. Downhole flow monitoring systems are frequently employed to characterize the fluid, measuring features, such as flow rate, fluid composition, density, viscosity, temperature, and pressure.

Current downhole flow monitoring systems frequently rely on a variety of complicated, fragile, expensive characterization techniques, including electromagnetic (EM) methods such as microwaves, SONAR, and gamma ray densitometry. There are several disadvantages of existing devices for downhole flow monitoring. For instance, EM systems, especially those that use antenna designs, have complicated circuitry that is difficult to fit downhole due to the high frequency range that is used for the majority of the time. Furthermore, systems that use gamma rays are radioactive systems, which are also complicated to implement in a downhole environment due to complexity.

Thus, a continuing need exists for a system for downhole flow monitoring that is simple in terms of principle, material used, and circuitry.

SUMMARY

This Summary is provided to introduce a selection of concepts that are further described in the Detailed Description. This Summary is not intended to identify key or essential features of the claimed subject matter, nor is it intended to be used as an aid in limiting the scope of the claimed subject matter.

In one aspect, embodiments disclosed herein relate to a flow meter. The flow meter includes a flow meter housing having a first side and a second side and a first end and a second end. The first side is configured to mount to a flow conduit and define an outlet flow orifice proximate to the first end. The second side defines an inlet flow orifice proximate to the second end. The flow meter housing defines a meter flow cavity and is configured to permit a fluid to be introduced into the inlet flow orifice, flow through the meter flow cavity, and pass from the outlet flow orifice. The flow meter further includes a sensor head positioned proximate to the outlet flow orifice. The sensor head is configured to vibrate at a frequency upon introduction of electrical power while in contact with a fluid. The sensor head also detects the vibration frequency of the sensor head and transmits the detected vibration frequency, which is associated with a density of the fluid.

In another aspect, embodiments disclosed herein relate to a system for detecting the density of a produced fluid. The system includes the flow sensor described above mounted to a production tubing. The flow sensor is positioned such that the outlet flow orifice is aligned with a fluid inlet of the production tubing. The system further includes a source of power in electrical communication with the flow sensor such that a sensor head of the flow sensor is induced to vibrate at a vibration frequency while in contact with a fluid, where the vibration frequency is associated with a density of the fluid. The system further includes a computer processor in signal communication with the flow sensor and configured to both receive a data signal from the sensor head of the flow sensor and to determine the associated density of the fluid in contact with the sensor head utilizing the data signal, where the computer processor is part of a computer system.

In another aspect, embodiments disclosed herein relate to a method for determining a fluid density of a fluid. The method includes introducing the flow meter described above into a wellbore, introducing a fluid into the flow meter, wherein the fluid is a production fluid, inducing a vibration in a sensor head in the flow meter, and detecting a vibration frequency of the sensor head.

Other aspects and advantages of the claimed subject matter will be apparent from the following Detailed Description and the appended Claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
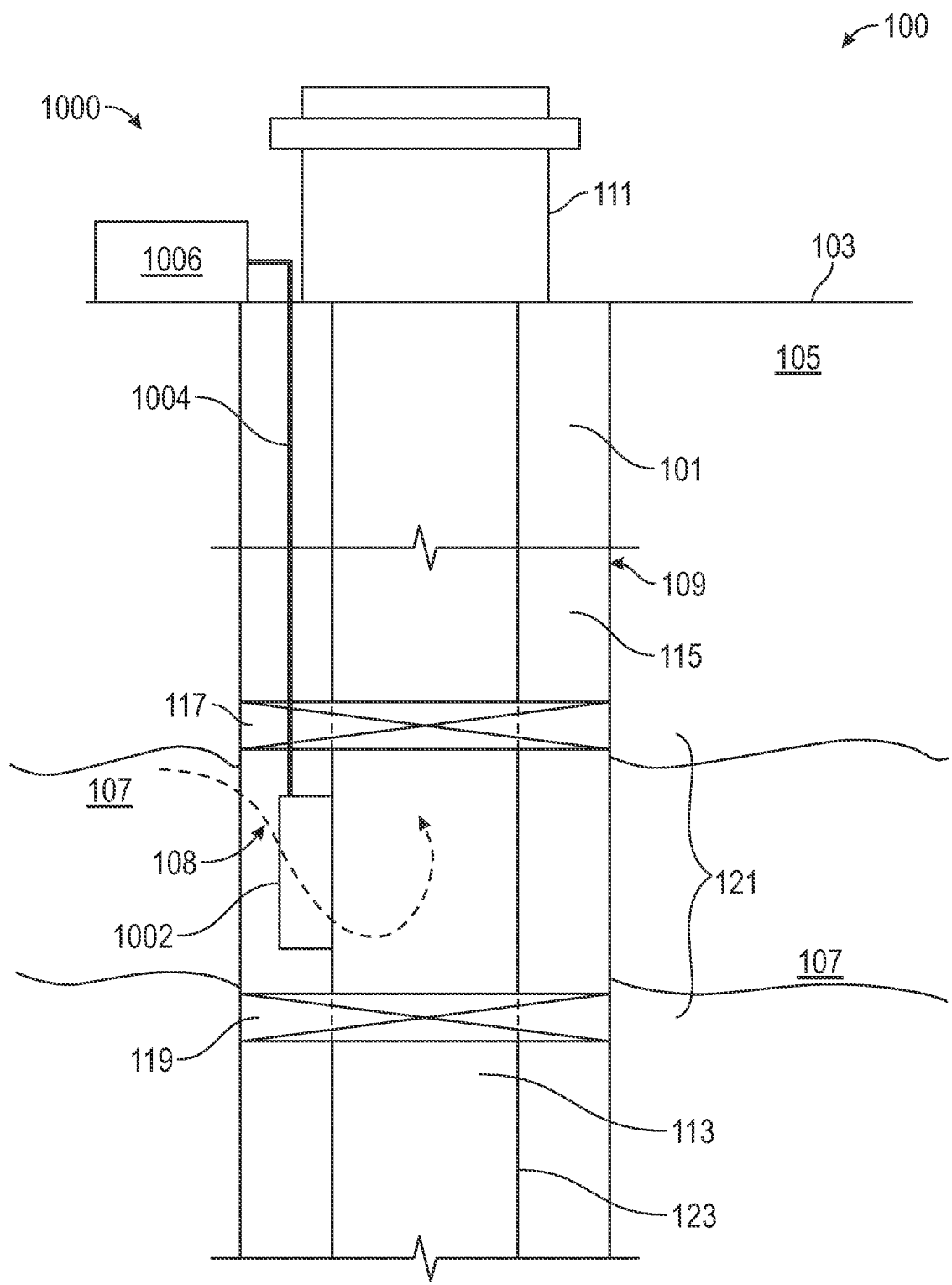
FIG. 1 is cross-sectional schematic of a flow meter system as part of a wellbore system according to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one aspect, embodiments disclosed relate to a downhole flow meter sensor for determining the fluid density with a vibrating piezoelectric sensor.

Embodiments of the present disclosure include a vibrating piezoelectric sensor. The vibrating piezoelectric sensor is induced to vibrate at a resonant frequency. However, when a fluid interacts with the vibrating piezoelectric sensor, the frequency of the vibrating sensor changes depending on the nature of the fluid, especially in relation to the density of the fluid. The resultant frequency of the vibrating sensor in the measured fluid may be used to determine the fluid density of the fluid. The fluid density, with other information, may also be used to further characterize the fluid. For example, the resonant circuit and the fluid form a system that has a characteristic resonant frequency. Therefore, for each fluid composition with the same circuitry (i.e., vibrating sensor), there is a resonant frequency that is characteristic of the system, such as the composition of the fluid, or mixture density. There is a window of frequencies where each fluid composition will have a signature. Thus, for each density (mixture), the vibrational frequency of the system (i.e., circuit and fluid) will have a specific value that will be compared with a predetermined baseline value of a set vibration frequency.

Embodiments of the present disclosure include a vibrating piezoelectric sensor having a piezoelectric layer. When an alternating current (AC) is transmitted through a piezoelectric layer, the piezoelectric layer expands and contracts due to the inverse piezoelectric effect, causing the piezoelectric material to vibrate. The rate of vibration is related to not only the power provided to the piezoelectric material but also what fluid the piezoelectric material is in contact with. Relatedly, when a piezoelectric layer experiences mechanical deformation, the piezoelectric layer generates an electric field due to the piezoelectric effect. Thus, some embodiments of the vibrating sensor may include a piezoelectric layer to vibrate in a fluid, to sense the dampened vibration due to the fluid, or both.

The vibrating piezoelectric sensor may have a small size. The remaining components of the flow meter system may also be small. Consequently, embodiments of the flow meter may be readily deployed into space-constrained environments, for example, within a wellbore.

The flow meter may be an elegant, uncomplicated yet robust device in configuration. Robustness is important for downhole applications, where repair or replacement is difficult or sometimes impossible. When exposed to a high pressure/high temperature (HPHT) environment, the flow meter may maintain its accuracy and robustness. Accuracy and robustness in a HPHT environment are important for downhole oil and gas production monitoring.

Other meters may utilize a nuclear source, which provides many complications in materials handling as well as source disposal issues. The embodiment piezoelectric sensor has no such issues.

FIG. 1 is a cross-sectional schematic of a flow meter system as part of a wellbore system. FIG. 1 shows a wellbore system 100 that includes a wellbore 101 traversing from a surface 103 through a subsurface 105 and a reservoir 107, which is also known as a hydrocarbon-bearing formation. Wellbore 101 is in fluid communication with reservoir 107 though wellbore wall 109. Wellbore wall 109 defines wellbore 101. The wellbore 101 as shown in FIG. 1 is in a vertical configuration; however, one of ordinary skill in the art would realize that any wellbore may have one or more of a variety of configurations, such as vertical, approximately vertical, deviated, approximately horizontal, and horizontal.

Mounted on the surface 103 is a production tee 111 (or "T"). Production tee 111 provides selective fluid and mechanical access to the wellbore 101 as well as production tubing 113. Production tubing 113 extends from the bottom of production tee 111 through wellbore 103 towards reservoir 107. Between production tubing 113 and wellbore wall 109 is the wellbore annulus 115, which is part of the wellbore 101. The wellbore annulus 115 is filled with fluid during preparation for or actual production, which is well appreciated by those of skill in the art.

For the sake of simplicity in describing the embodiment apparatuses, systems, and methods, the production tee and production casing are not shown with many other known casings and tubing supports; however, one of ordinary skill knows that a wellbore with a production tubing mounted within has many additional support structures, such as casings, tubings, hangers, cement, and valves that are not shown in FIG. 1, but which are assumed present.

In further reference to the wellbore system 100, two packers 117, 119 are provided for such that a portion of the wellbore annulus is fluidly isolated 121 therebetween from the remainder of the wellbore annulus 115. The production tubing 113 passes through and is frictionally coupled to both uphole packer 117 and downhole packer 119. The two packers 117, 119 frictionally couple to an exterior surface of the production tubing 123 and to the wellbore wall 109 such that fluid in the wellbore annulus 115 may not bypass either packer 117, 119.

It is within the fluidly isolated portion 121 of the wellbore annulus that the flow meter 1002 is utilized. Flow meter 1002 in FIG. 1 is shown coupled to the exterior surface of production tubing 123. Flow meter 1002 has two fluid ports (not shown) such that formation fluid may flow 108 (arrow) from the reservoir 107 into the isolated portion of the wellbore annulus 121 into, through, and out of the flow meter 1002 and into the production tubing 113. Such fluid production passes towards the surface 103 via the production tubing 113.

The flow meter system 1000 may include several other components besides the flow meter 1002. Power to energize and operate the flow meter 1002 may be transmitted downhole and signals associated with detected conditions by the flow meter 1002 may be transmitted uphole utilizing a power and signal conduit 1004. On the surface 103, the power and signal conduit 1004 may couple with surface support equipment 1006. Such surface support equipment 1006 may include an apparatus that is configured to provide reliable and steady power in the form of alternating current electricity to the flow meter 1002. As well, the surface support equipment 1006 may also include a computer processor operating with pre-set instructions in memory to receive a data signal, interpret the data signal, determine an action in accordance with a pre-set instruction, and transmit a command signal that results in an action. The operation of such a computer processor and associated equipment may be described forthcoming.

Figure 2A:
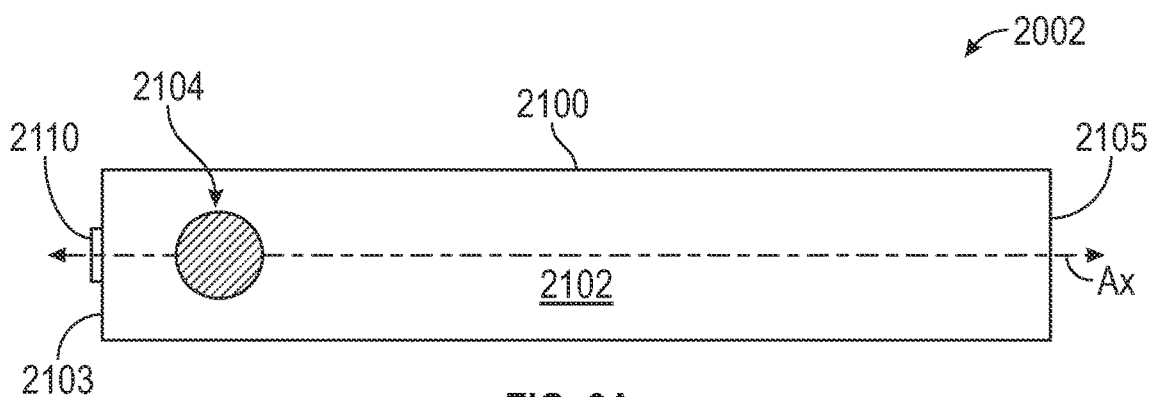
FIGS. 2A-2D provide several external views of a flow meter according to one or more embodiments.
Figure 2B:
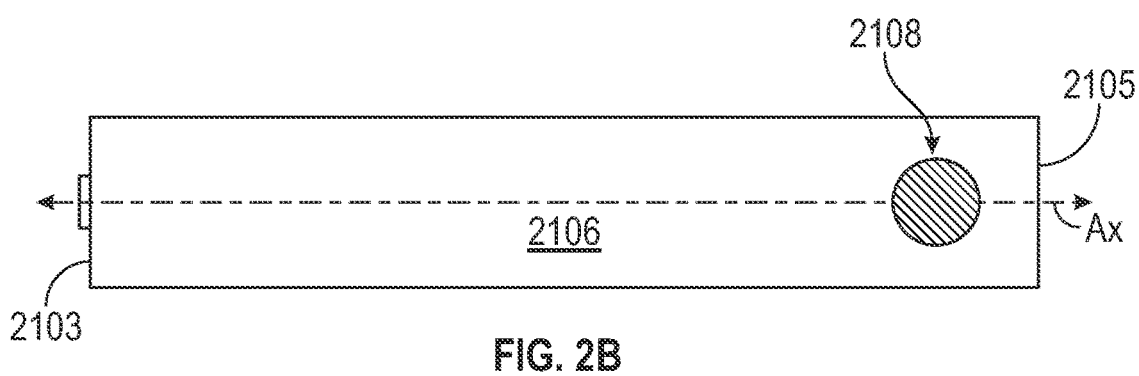
Figure 2C:
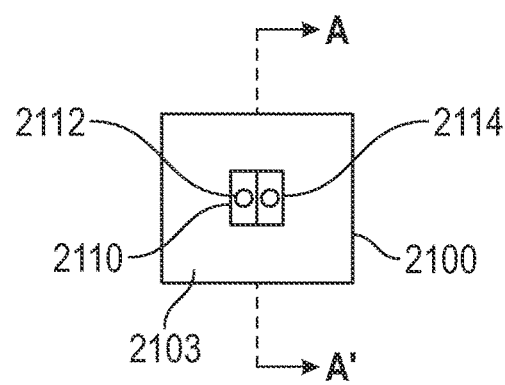
Figure 2D:
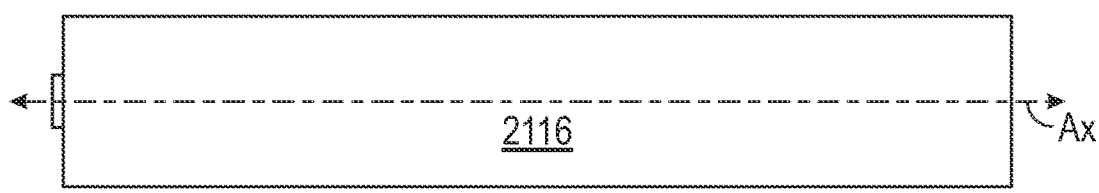

FIGS. 2A-2D provide several external views of a flow meter. FIG. 2A shows a view from the bottom-up; FIG. 2B shows a view from the top-down; FIG. 2C shows a view from a first end; and FIG. 2D shows a side view. View lines AA' of FIG. 2C are associated with FIG. 4, which provides a reveal view of a similar flow meter.

Flow meter 2002 of FIGS. 2A-2D has a rectangular cuboid configuration for a flow meter housing 2100; therefore, it has four sides. There is a longitudinal axis Ax viewable with FIGS. 2A, 2B, and 2D. The shape of the flow meter housing may be any regular geometric or irregular shape (e.g., circular, oval, rectangular) that a person of ordinary skill may desire such that the operation of the flow meter sensors is unencumbered and the flow meter housing fits within the space available in the downhole outfit and overall system architecture.

FIG. 2A shows an outlet flow orifice 2104 as defined by the lower surface 2102 of flow meter housing 2100. The position of outlet flow orifice 2104 is closer to the first end 2103 of the flow meter 2002; however, in some instances the position of the outlet flow orifice may be closer to the second end of the flow meter, if desired.

Although the lower surface in FIG. 1 is shown as appreciably flat (see also FIG. 2D), in some instances the lower surface of the flow meter housing may be curved to match the arc of an exterior surface of a pipe, tubing, casing, or other fluid conduit utilized with the flow meter. For example, a flow meter may have a lower surface configured with an arc that is approximately the same as the circumferential arc of an exterior surface of a production tubing. In such an instance, the meter may couple or connect flush with the exterior surface.

FIG. 2B shows an inlet flow orifice 2108 as defined by the upper surface 2106 of flow meter housing 2100. The position of outlet flow orifice 2108 is closer to the second end 2105 of the flow meter 2002; however, in some instances the position of the outlet flow orifice may be closer to the first end of the flow meter, if desired. In configurations of the flow meter housing, it may be desirable in some instances to position the inlet flow orifice and the outlet flow orifice at opposing ends of the main longitudinal axis of the apparatus. As seen in FIG. 1, not only is outlet flow orifice 2104 proximate to an opposing end of the flow meter housing 2100 from inlet flow orifice 2102, but it is also on an opposing plane (lower surface 2102 versus upper surface 2106). This configuration extends the time of travel within the interior of the flow meter 2002 along longitudinal axis Ax. Although not wanting to be bound by theory, maximizing the time of flow within the device before a produced fluid encounters the sensors used for detecting density, reducing turbulence and backflow that may cause errors in detecting the frequency vibration of the sensors' heads. In one or more embodiments, the sensors are at the end of the system to allow the flow system to be established such that there are less temporal irregularities that will require extended sampling time to have better averaged values. In another embodiment, the system could be short or bifurcated; however, longer averaging time windows would be needed. In yet another embodiment, the inlet orifice could be positioned at the second end such that the inlet flow orifice and the outlet flow orifice are close to maximize internal fluid length. However, the averaging time will need to be longer assuming the fluid mixture does not change substantially. The sensors can be placed at any position of the flowing system, including upstream positions, provided that there is a proper design for housing in terms of backflow. The flow in the production pipe would have a pressure lower than the flow coming from the formation into the flow meter pipe flow; therefore, no backflow is expected.

In regard to the inlet and outlet flow orifices, in one or more embodiments the orifices may have the same shape. In one or more embodiments, the inlet and outlet flow orifices may have a similar void area. As an example, in FIG. 1 the inlet and outlet orifices are shown approximately with a similar void area and both in a circular configuration. Alternatively, the inlet and outlet flow orifices may have different shapes from one another and different void areas. Additionally, the shape of the inlet and outlet flow orifices could be similar, the void areas different, or vice versa. The most significant aspect is that the outlet flow orifice is designed to properly house the sensing device.

FIG. 2C shows where a conduit, such as a power and signal conduit 1004 of FIG. 1, may couple with the flow meter 2002. Conduit connector 2110 defines a first port 2112 and a second port 2114 for conveying power into and signals out of the flow meter 2002.

FIG. 2D shows an adjacent surface side surface 2116 that couples lower surface 2102 to upper surface 2106. Alternatively, the inlet orifice configuration could be on multiple surfaces, such as two side surfaces and the upper surface. Since the inlet orifice does not affect the overall system in terms of the measurement principle, it can have any shape or configuration provided that it functions as intended.

Figure 3A:
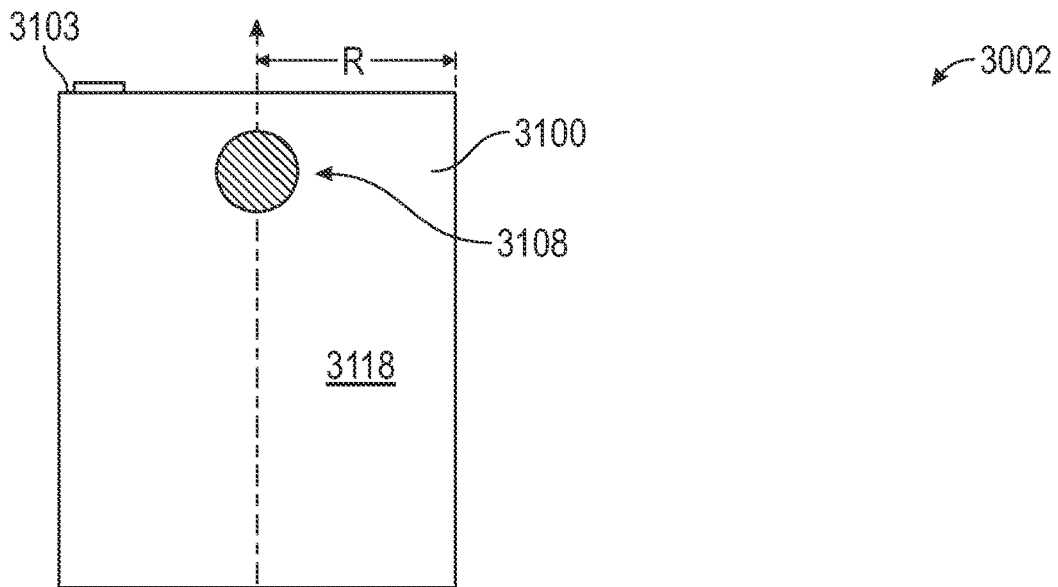
FIGS. 3A-3C provide several views of a flow meter according to one or more embodiments.
Figure 3B:
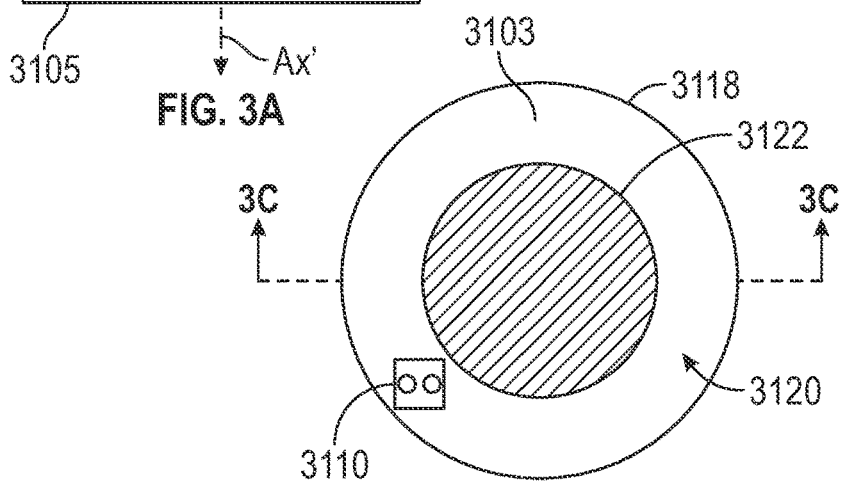
Figure 3C:
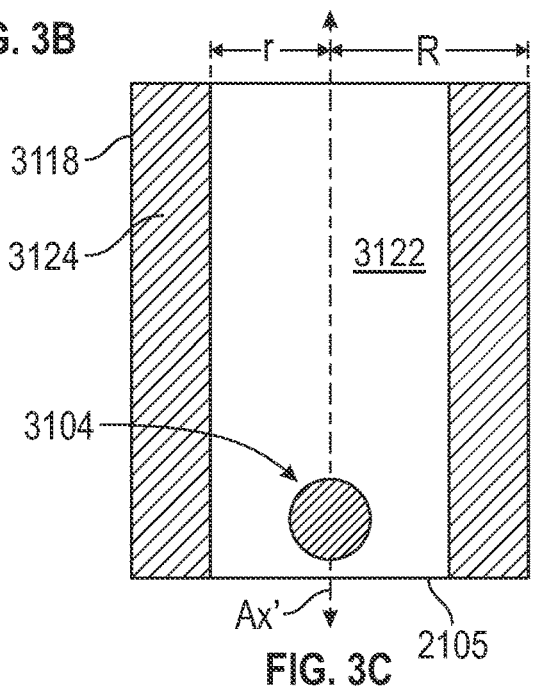

FIGS. 3A-3C provide several views of a flow meter. FIG. 3A shows a view from the side of the exterior of the flow meter; FIG. 3B shows a view from the top-down; and FIG. 3C shows a reveal view from the same perspective as FIG. 3A. View lines BB' of FIG. 3B are associated with FIG. 3C, which provides a reveal view of the flow meter.

FIG. 3A introduces flow meter 3002, a cylindrical annular configuration of a flow meter. Flow meter housing 3100 includes outer surface 3118 that circumferentially surrounds a longitudinal axis Ax' at a radius of R from the longitudinal axis Ax'. Similar to flow meter 2002 of FIG. 2A, first end 3103 and second end 3105 are identified as opposing annular planes along the longitudinal axis Ax' of the flow meter 3002. Outer surface 3118 defines an inlet flow orifice 3108 proximate to the first end 3103.

FIG. 3B shows a view of first 3103 of flow meter 3002. From this view, both the edge of outer surface 3118 and the inner surface 3122 may be observed. Inner surface 3122 is shown defining in part the central void 3120 of the cylindrical annular form. FIG. 3B also shows conduit connector 3110 at first end 3103. View lines BB' provide demarcation of a reveal utilized in FIG. 3C.

FIG. 3C is a reveal with the same vantage point of FIG. 3A. With the reveal along view lines BB', the inner surface 3122 may in part be viewed circumferentially and running parallel along longitudinal axis Ax' for the same length as the outer surface 3118. Inner surface 3122 has a radius of r, which is less than the radius R for outer surface 3118. This defines, in part, an internal meter fluid cavity 3124, which is an annular-shaped void defined by the outer surface 3118, the inner surface 3122, the first end 3103, and the second end 3105. Inner surface 3122 defines an outlet flow orifice 3104 proximate to the first end 3103.

Similar to flow meter 2002, flow meter 3002 has the inlet and outlet flow orifices not only at opposing ends of the flow meter but also on opposing surfaces (outer versus inner). In doing so, this may lengthen the period in which the produced fluid resides in the internal void of the flow meter—the fluid not only would traverse most of the length (parallel with longitudinal axis Ax') but also half the circumference of the inner surface (with radius=r) to reach the outlet flow orifice and pass from the flow meter. In one or more embodiments, flow baffles could be used to extend the length of time, aiding in establishing a better flow and avoiding any temporal or transient changes that would require extra sampling times for better averaging.

Figure 4:
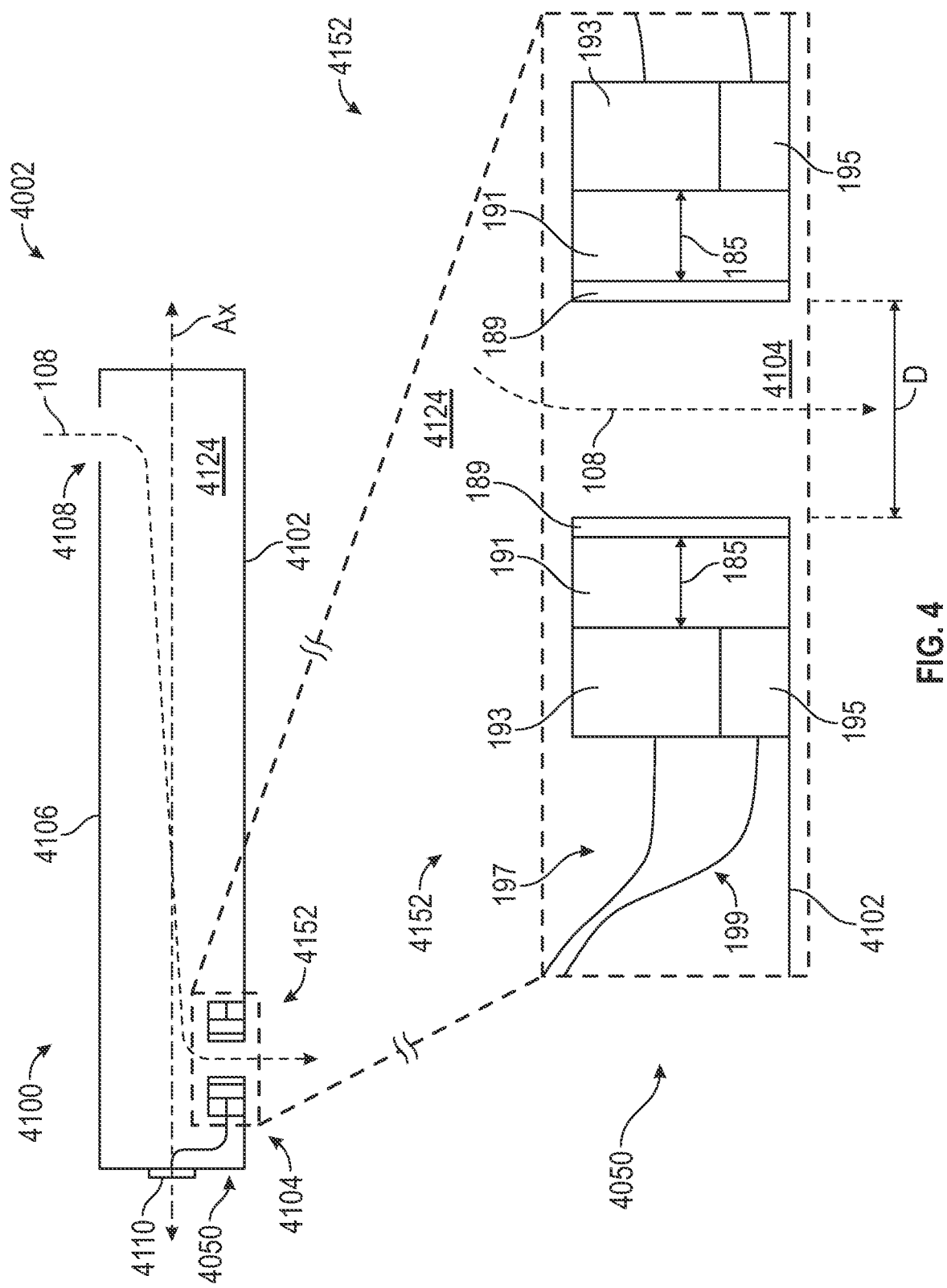
FIG. 4 depicts a flow meter in reveal with an inset view of the sensor heads according to one or more embodiments.

FIG. 4 depicts a flow meter in reveal with an inset view of the sensor heads. Flow meter 4002 is similar in many aspects with the flow meters shown in FIGS. 2A-2D; in fact, the view demarcation lines AA' may be taken as the view perspective for FIG. 4.

Flow meter 4002 includes flow meter housing 4100 having a lower surface 4102 and an upper surface 4106 defining in part the meter fluid cavity 4124. Lower surface 4102 also defines the outlet flow orifice 4104 and the upper surface 4106 defines the inlet flow orifice 4108 at the opposing end. For perspective, a formation fluid flow 108 (dotted arrow) is shown traversing the flow meter 4002 as would be expected. Flow meter sensor 4050 is associated with outlet flow orifice 4104 such that the fluid traversing the meter fluid cavity 4124 of flow meter 4002 must pass between the two sensor heads 4152 of flow meter sensor 4050 (see formation fluid flow 108 dotted arrow).

The inset of FIG. 4 highlights several features of the flow meter sensor 4050. Flow meter sensor is a vibrating sensor that is in the instance of flow meter 4002 positioned adjacent to and upstream of the outlet flow orifice 4104. The inset is a simplified schematic of the components of an embodiment of a vibrating sensor. A person having ordinary skill in the art will appreciate the many additional arrangements the components may take. Further, embodiments of the vibrating sensor may have additional components not shown here.

The inset shows in this simplified version of a flow meter sensor two sensor heads opposing one another across the void of an outlet flow orifice. Each sensor head 4152 includes an electrode 189; a piezoelectric layer 191; a driving module 193; and a sensing module 195. Each electrode 189 is coupled or connected to a piezoelectric layer 191. Each piezoelectric layer 191 is positioned between an electrode 189 and a driving module 193. Each driving module 193 is electrically connected to a piezoelectric layer 191 via conductive pathways not depicted for the sake of simplicity. Each driving module 193 is also electrically connected to a driving module conduit 197, which may be coupled to a conduit providing power (not depicted) through conduit connector 4110. Each sensing module 195 is signally connected to both a piezoelectric layer 191 and an electrode 189 via pathways that are not depicted for the sake of simplicity. Each sensing module 195 is also signally connected to a sensing module conduit 199, which may be coupled to a conduit providing a pathway for signal transmission (not depicted) through conduit connector 4110.

Flow meter sensor 4050 is configured to detect a vibration rate of the sensor head 4152 in a formation fluid flow 108 as it passes through outlet flow orifice 4104. The vibration rate is impacted by the density of the fluid in which the sensor head is vibrating, and therefore the vibration rate is associated with density of the fluid in which it is in fluid contact. As shown in FIG. 4 and its inset, sensor heads 4152 of flow meter sensor 4050 are positioned at the outlet flow orifice 4104. As previously indicated, sensor heads 4152 are positioned on opposing sides of the outlet flow orifice 4104, but this is not necessary. Wherever they are positioned, the sensor heads must oppose each other in order to sense the damping effects due to the mixture density changes. Placing the sensor heads at the outlet flow orifice allows for the flow to be stabilized. If placed at the inlet flow orifice, additional averaging time would be needed.

The two sensor heads 4152 are positioned a distance D apart, which is also the diameter of the outlet flow orifice 4104, but this is not necessary in that the sensor head may be a further distance than the diameter of the outlet flow orifice within the flow meter. Diameter D is a fixed value associated with the outlet flow orifice for the determination of fluid flow through the meter. Such an arrangement allows sensor heads 4152 to vibrate the produced fluid flowing (108) through outlet flow orifice 4104. The distance D is selected by design based on the overall architecture of the system. However, the distance D has an optimal value for which the sensors' vibrations are optimal as well.

Some embodiments of the flow meter sensor may be designed for deployment in high pressure/high temperature (HPHT) conditions. In some embodiments, the size/geometry of each vibrating sensor, the distance D between the vibrating sensors, the arrangement of the vibrating sensors, or a combination may be configured for a HPHT environment. Such configuration of the vibrating sensors may depend on the geometric, dynamic, and physical properties of the flow meter system. Some embodiments of the flow meter sensors may be designed for deployment in corrosive environments. The downhole equipment is designed to handle downhole conditions, or the element will be housed in housings to protect from intolerable conditions.

Electrodes 189 are configured to connect the piezo-vibrators with the circuitry and excite them with electric current. The electrodes 189 are basic circuitry for connecting the piezo-vibrators, which vibrate when subject to current excitation. The electrodes 189 can be arranged in any configuration provided that they serve the connection purposes.

Driving module 193 are configured to supply piezoelectric layers 191 with alternating current (AC) electrical power. This AC electrical power generates a driving force, which causes piezoelectric layers 191 to vibrate (depicted as arrows 185). By supplying constant AC electrical power, the driving module induces the piezoelectric layer to vibrate at a consistent frequency, called the first frequency.

In one or more embodiments of the flow meter, the sensor head includes one or more driving modules. One or more embodiments include a driving module for each sensor head. In one or more embodiments, a single driving module is utilized to drive multiple sensor heads simultaneously.

In one or more embodiments of the flow meter, a sensor head may be configured to drive a first frequency within a particular frequency range at a first fluid density. In one or more embodiments, the first frequency of the vibrating sensors may reflect the intended deployment environment, for example, one or more of the temperature, pressure, and fluid composition. In one or more embodiments, a first frequency of the sensor head may be between 1 kHz and 100 kHz. The system targets relatively low range frequencies in the piezo spectra, allowing for densities to be measured in the range of 100 to 1200 Kg/m$^3$.

In one or more embodiments of the flow meter, the vibrations of the sensor head may be caused by the inverse piezoelectric effect. In one or more embodiments, the vibrations of the sensor head may be caused by an alternative means of generating a vibration, for example, mechanical oscillation, such as by a piston. In one or more embodiments, vibrations of the sensor head may be passively driven by the motion of the formation fluid flow contacting the sensor head. The vibrations of the vibrating sensors are synchronized to sense any changes due to the change in density. The amplitudes of the vibrations will be part of the overall design of the sensing system through laboratory calibration. For instance, the combination of frequency and amplitude will have an optimal setting at which the sensory response is optimal, which will be determined by performing calibrations.

In one or more embodiments of the flow meter, the driving module may include one or more power supply. The power supply may supply AC electrical power. In one or more embodiments, the driver may supply AC power with a frequency in a range of from about 1 millihertz (mHz) to 1,500 hertz (Hz). In one or more embodiments, the driving module may supply AC electrical power having a pulse height in a range of from about 1 milliamp (mA) to 20 mA. In one or more embodiments, the driving module may supply AC electrical power having a single level in a range of from about 1 mA to 10 mA. In one or more embodiments, the driving module may supply AC electrical power having a pulse width of about 20 microseconds (μs). The pulse height, frequency, and amplitude will be determined by calibration of the system based on pressure-volume-temperature (PVT) data known for a particular field. The voltage, frequency, and amplitude will be determined based on the optimum anticipated frequency that is calibrated ideally before application. The voltage (pulse height) is a function of the piezo-electric system chosen.

In one or more embodiments, there may be a relationship between the frequency of the AC power provided and the first frequency of the vibrating sensor. The relationship can be determined during calibration of the system in different environments, such as in a vacuum, pure water, pure oil, and mixtures.

The source of the power supplied by the driving module may be any reasonable power source, for example, an electrical power cable (for example, via wireline), an energy storage device (for example a battery or fuel cell), a generator, or an alternator. One of ordinary skill in the art will appreciate there may one or more means for providing steady power to the flow meter.

Sensing modules are configured to measure the vibrational frequency of sensor heads. A fluid with a second density may dampen the vibrational frequency of sensor head to less than the first frequency even when the driving module is provided with constant power that would produce the first frequency in the first fluid. The vibrational frequency of sensor head is detected by sensing module. The sensing module is also configured to transmit a signal associated with the detected frequency that is measured by the sensing module.

In one or more embodiments of the flow meter, a sensor head includes one or more sensing module. In one or more embodiments, a sensing module is included with each sensor head. In one or more embodiments, a single sensing module is utilized for a plurality of sensor heads.

In one or more embodiments of the flow meter, the vibrations of the sensor head may be detected by the piezoelectric effect. In one or more embodiments, the sensing module may detect an electric field generated by the piezoelectric layer due to mechanical deformation. In one or more embodiments, the vibrations of the sensor head may be detected by another method of detecting a vibration, for example, an electrical switch.

In one or more embodiments of the flow meter, the sensor head may be configured to detect a second frequency within a particular frequency range. In one or more embodiments, the second frequency of the sensor head may reflect the intended deployment environment, for example, one or more of temperature, pressure, and fluid composition. In one or more embodiments, the second frequency of the vibrating sensors may be in a range of from about 50 KHz to 500 KHz. Slightly higher frequencies can be utilized for detecting small changed in the measurement ranges.

In one or more embodiments of the flow meter, the driving module and the sensing module may be separate components that are coupled or connected to one another. In one or more embodiments, the driving module and the sensing module may be the same component.

Figure 5:
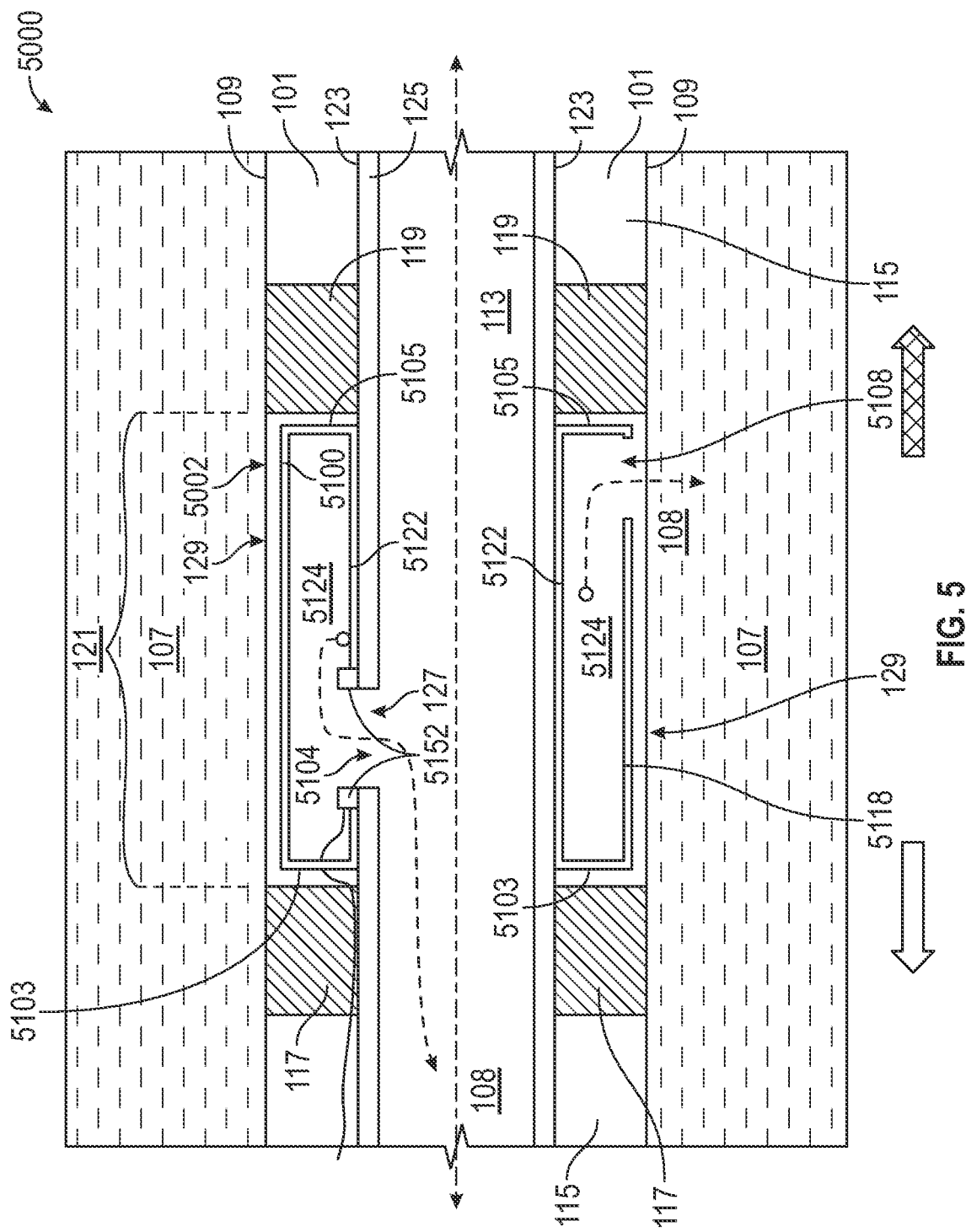
FIG. 5 depicts a flow meter in a wellbore system in reveal according to one or more embodiments.

FIG. 5 depicts a flow meter in a wellbore system in reveal. Flow meter 5000 is similar in many aspects with the flow meters shown in FIGS. 3A-D in that it is of cylindrical annular configuration. One of ordinary skill in the art may presume in examining FIG. 5 that the flow meter 5000 is circumferential around a central wellbore axis WbAx. Flow meter 5000 is shown positioned in situ in wellbore system 100 in the isolated portion of the wellbore annulus 121. First end 5103 of flow meter 5000 is positioned towards the uphole direction; second end 5105 is positioned towards the downhole direction.

Flow meter 5000 is shown coupled or connected to the production tubing 113. More specifically, the inner surface 5122 of flow meter housing 5100 is coupled or connected to the exterior surface of production tubing 123. The production tubing wall 125 defines a production tubing flow inlet 127, which may provide fluid access for formation fluid to flow (arrow 108) into the production tubing 113, and which may be of similar configuration to the outlet flow orifice 5104 of flow meter 5000.

In FIG. 5, the positioning of flow meter 5000 is such that it is coupled to the production tubing exterior surface 123 such that outlet flow orifice 5104 and the production tubing flow inlet 127 are aligned.

One or more of the sensor heads may be positioned anywhere along the fluid flow pathway between the inlet flow orifice and the outlet flow orifice of the flow meter. Although shown just upstream of the outlet flow orifice 5104 relative to the formation fluid flow (arrow 108), a sensor head may be positioned anywhere within the flow meter housing 5100 as long as it is effective in detecting the vibration frequency of the sensor head 5152 based upon the fluid contacted in the meter fluid cavity 5124.

With regard to the configuration of flow meter 5000, formation fluid flow 108 is shown in FIG. 5 to issue from reservoir 107, traverse through a small amount of portion of isolated wellbore annulus 129, and into the meter fluid cavity 5124 via inlet flow orifice 5108. The formation fluid flow 108 is then represented to traverse to the other side of the production tubing, such as taking a pathway towards or away from the viewer (open circle), traversing within the meter fluid cavity 5124 in an upward direction, and then taking a pathway away or towards the viewer (dark circle) to return to view in another section of the meter fluid cavity 5124. From there, the formation fluid flow 108 traverses past the sensor heads 5152, the outlet flow orifice 5104, and the production tubing flow inlet 127 to enter the interior of production tubing 113. The formation fluid flow 108 is then directed in an uphole direction towards the surface (not shown). As previously stated, this flow path being made longer than merely positioning the inlet and outlet flow orifices in close proximity to one another is believed to dampen any potential turbulence that may come from the hydrocarbon-bearing fluid emerging from the reservoir.

In FIG. 5 it also may be observed that there is a fluid gap that is between the flow meter housing, the packers, the exterior surface of the production tubing, and the wellbore wall. A portion of the isolated wellbore annulus 129, as previously suggested, is a fluid-filled gap of the isolated portion of the wellbore annulus 121, as previously defined, that is the remainder volume that is not occupied by the flow meter 5002. Although not wanting to be bound by theory, it is believed that a slight gap filled with fluid from the reservoir between the flow meter and the wellbore wall also may have somewhat of a dampening effect on any potential turbulence or back mixing that may occur. The targeted configuration described herein aids in damping any flow disturbances to ensure good measurements and avoid any transient effects.

Although represented in the discussion of FIGS. 3 and 5 as representing an embodiment that is fully circumferential both in flow meter housing and meter fluid cavity, in one or more embodiments the flow meter configuration may not be fully circumferential. For example, a flow meter may have a housing configuration that is a semi-cylindrical annular shape, or a quarter-cylindrical annular shape. As well, although the flow meter housing of the flow meter may be fully cylindrical in configuration, the meter fluid cavity may not be fully annular; that is, there may be only a half or quarter-portion of an annular volume making up the meter fluid cavity internally. While FIG. 5 depicts one targeted configuration, other shapes and configurations are possible provided the intended function is performed, as can be appreciated by one skilled in the art.

A portion of the flow meter system 5000 is represented in FIG. 5. As previously described in FIG. 1, the power and signal conduit may be coupled with surface support equipment, such as power generation and transmission devices and systems and sensor monitoring and recording systems with a computer processor, that is not pictured.

In one or more embodiments, the vibration data detected with a sensor head data may be recorded in situ, such as at a flow meter and stored on non-transitory computer memory. The computer memory may be one or more computer hard-drives, or one or more computer memory tapes, or any other convenient computer memory media familiar to one skilled in the art. The vibration data may be immediately, periodically, intermittently, or upon recovery to the surface be transmitted to a computer system with a computer processor for interpretation. The computer processor may be located within the wellbore, on the surface near wellbore, or may be located at a remote location that may be in another city, country, or continent. The vibration data may be transmitted from flow meter sensor to computer for processing. The transmission may occur through power and signal conduit or by utilizing any other known mean of transmitting information from a downhole position uphole.

Figure 6:
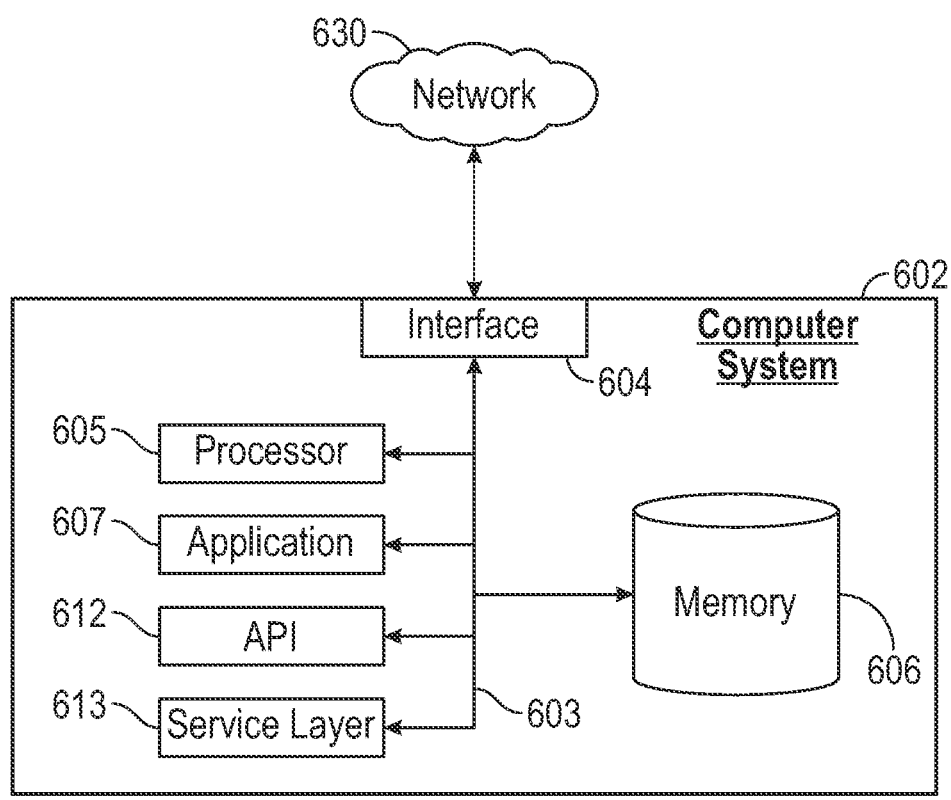
FIG. 6 depicts shows a computer system in accordance with one or more embodiments.

FIG. 6 shows a computer system in accordance with one or more embodiments. FIG. 6 further depicts a block diagram of a computer system 602 used to provide computational functionalities associated with described algorithms, methods, functions, processes, flows, and procedures as described in this disclosure. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system 602 may include a computer system that includes an input device, such as a keypad, keyboard, touch screen, or other device that can accept user information, and an output device that conveys information associated with the operation of the computer system 602, including digital data, visual, or audio information (or a combination of information), or a graphical user interface (GUI).

The computer system 602 can serve in a role as a client, network component, a server, a database or other persistency, or any other component (or a combination of roles) of a computer system 602 for performing the subject matter described in the instant disclosure. The illustrated computer system 602 is communicably coupled with a network 630. In some implementations, one or more components of the computer system 602 may be configured to operate within environments, including cloud-computing-based, local, global, or other environment (or a combination of environments).

At a high level, the computer system 602 is an electronic computing device operable to receive, transmit, process, store, or manage data and information associated with the described subject matter. According to some implementations, the computer system 602 may also include or be communicably coupled with an application server, e-mail server, web server, caching server, streaming data server, business intelligence (BI) server, or other server (or a combination of servers).

The computer system 602 can receive requests over network 630 from a client application (for example, executing on another computer system 602 and responding to the received requests by processing the said requests in an appropriate software application. In addition, requests may also be sent to the computer system 602 from internal users (for example, from a command console or by other appropriate access method), external or third-parties, other automated applications, as well as any other appropriate entities, individuals, systems, or computers.

Each of the components of the computer system 602 can communicate using a system bus 603. In some implementations, any or all of the components of the computer system 602, both hardware or software (or a combination of hardware and software), may interface with each other or the interface 604 (or a combination of both) over the system bus 603 using an application programming interface (API) 612 or a service layer 613 (or a combination of the API 612 and service layer 613. The API 612 may include specifications for routines, data structures, and object classes. The API 612 may be either computer-language independent or dependent and refer to a complete interface, a single function, or even a set of APIs. The service layer 613 provides software services to the computer system 602 or other components (whether or not illustrated) that are communicably coupled to the computer system 602. The functionality of the computer system 602 may be accessible for all service consumers using this service layer. Software services, such as those provided by the service layer 613, provide reusable, defined business functionalities through a defined interface. For example, the interface may be software written in JAVA, C++, or other suitable language providing data in extensible markup language (XML) format or another suitable format. While illustrated as an integrated component of the computer system 602, alternative implementations may illustrate the API 612 or the service layer 613 as stand-alone components in relation to other components of the computer system 602 or other components (whether or not illustrated) that are communicably coupled to the computer system 602. Moreover, any or all parts of the API 612 or the service layer 613 may be implemented as child or sub-modules of another software module, enterprise application, or hardware module without departing from the scope of this disclosure.

The computer system 602 includes an interface 604. Although illustrated as a single interface 604 in FIG. 4, two or more interfaces 604 may be used according to particular needs, desires, or particular implementations of the computer system 602. The interface 604 is used by the computer system 602 for communicating with other systems in a distributed environment that are connected to the network 630. Generally, the interface 604 includes logic encoded in software or hardware (or a combination of software and hardware) and operable to communicate with the network 630. More specifically, the interface 604 may include software supporting one or more communication protocols associated with communications such that the network 630 or interface's hardware is operable to communicate physical signals within and outside of the illustrated computer system 602.

The computer system 602 includes at least one computer processor 605. Although illustrated as a single computer processor 605 in FIG. 4, two or more processors may be used according to particular needs, desires, or particular implementations of the computer system 602. Generally, the computer processor 605 executes instructions and manipulates data to perform the operations of the computer system

602 and any algorithms, methods, functions, processes, flows, and procedures as described in the instant disclosure.

The computer system 602 also includes a memory 606 that holds data for the computer system 602 or other components (or a combination of both) that can be connected to the network 630. For example, memory 606 can be a database storing data consistent with this disclosure. Although illustrated as a single memory 606 in FIG. 4, two or more memories may be used according to particular needs, desires, or particular implementations of the computer system 602 and the described functionality. While memory 606 is illustrated as an integral component of the computer system 602, in alternative implementations, memory 606 can be external to the computer system 602.

The application 607 is an algorithmic software engine providing functionality according to particular needs, desires, or particular implementations of the computer system 602, particularly with respect to functionality described in this disclosure. For example, application 607 can serve as one or more components, modules, or applications. Further, although illustrated as a single application 607, the application 607 may be implemented as multiple applications 607 on the computer system 602. In addition, although illustrated as integral to the computer system 602, in alternative implementations, the application 607 can be external to the computer system 602.

There may be any number of computers 602 associated with, or external to, a computer system 602, wherein each computer 602 communicates over network 630. Further, the term "client," "user," and other appropriate terminology may be used interchangeably as appropriate without departing from the scope of this disclosure. Moreover, this disclosure contemplates that many users may use one computer system (602), or that one user may use multiple computer systems 602.

Figure 7:
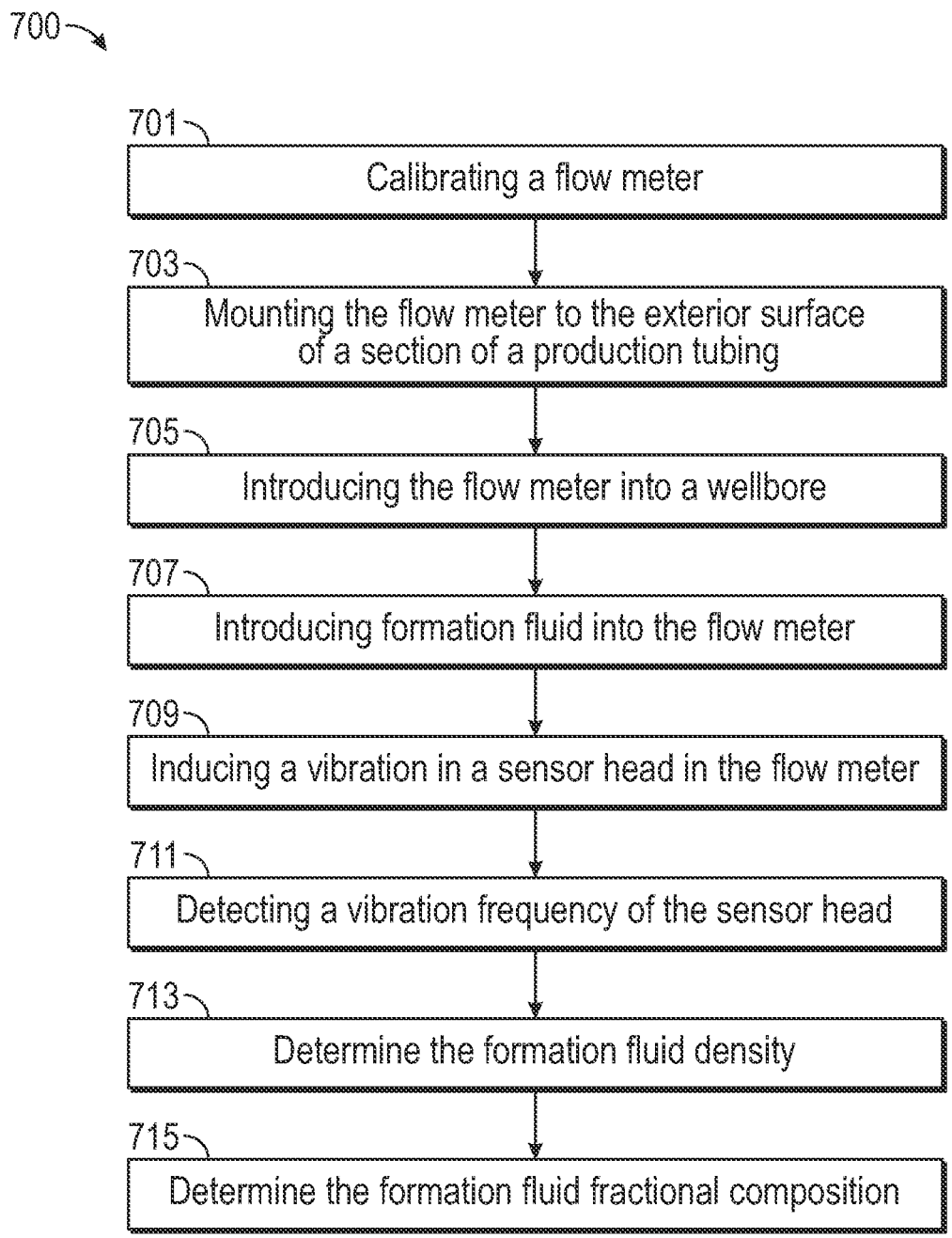
FIG. 7 is a flow chart of the method according to one or more embodiments.

FIG. 7 depicts a method for determining a fluid density for a formation fluid. Method 700 may include a step of calibrating a flow meter 701.

An amount of electrical power may be provided to the flow meter, and specifically the sensor head of the flow meter, in the presence of a calibration fluid having an associated calibration fluid density, or in the presence of a set of calibration fluids having an associated set of calibration fluid densities, so as to provide for correlation or mathematical relationship between the detected vibration rate or oscillation of the sensor head and the density of the calibration fluid.

In one or more embodiment, the calibration fluid may be a sparse fluid, such as when the sensor is induced to vibrate in a partial vacuum. In one or more embodiment, the calibration fluid may be a pure or mixture of gas, such as air, nitrogen, methane, carbon dioxide, or combinations thereof. In one or more embodiment, the calibration fluid may be a pure or mixture of liquid, such as a water, liquid carbon dioxide, a hydrocarbon, and combinations thereof. An example of a useful calibration fluid includes a synthetic formation fluid, such as a combination of a synthetic brine, naphtha, and diesel. In embodiments where the combination of fluids may be immiscible, such as a water and a hydrocarbon, the fluid may be an emulsion (two liquids) or a foam (liquid and a gas).

In one or more embodiments, the calibration may be performed at an elevated pressure. In one or more embodiments, the calibration may be performed at an elevated temperature. "Elevated" in these instances refers to greater than room conditions, such as 25° C. and 1 atmosphere.

In one or more embodiments, the calibration may take place on the surface. In one or more embodiments, the calibration may take place while the flow meter is positioned in an isolated portion of the wellbore annulus, that is in situ of the wellbore and in contact with formation fluid. In such an instance, the formation fluid may be sampled while the calibration is occurring, and a separate bulk fluid density determined. After independently determining the bulk fluid density, the flow meter may be calibrated to reflect the independent density determination, if necessary.

As part of the use of a calibrated flow meter with a flow meter system, in one or more embodiments the between the detected vibration of the sensor head and the associated density value of a fluid in contact with the sensor head may be incorporated into a set of pre-determined instructions located in memory or otherwise accessible through a network for a computer process to utilize in determining the density of a fluid. [Calculation of the resonant frequency of the vibrating sensor may be based on a derived form of the Euler-Bernoulli beam theory for free beams. In some embodiments, the multiphase fluid density ($\rho_{multiphase}$) may be related to the detected oscillating frequency of the vibrating sensor via the equation:

$$\rho_{multiphase} = C_1 + C_2 f + C_3 f^2 \quad \text{Equation 1}$$

where f is the sensed second frequency and $C_1$, $C_2$, and $C_3$ are coefficients.

In some embodiments, calibrating the vibrating sensor may involve experimentally deriving the coefficients $C_1$, $C_2$, and $C_3$. The coefficients $C_1$, $C_2$, and $C_3$ may depend upon the exact geometry and configuration of the vibrating sensor. In some embodiments, each vibrating sensor may be individually calibrated, for example, to account for slight manufacturing variation.

Continuing with FIG. 7, in step 703, the flow meter is mounted to an exterior surface of a portion of a production tubing. Regardless of the type of mounting utilized, the sensor head and detection of the vibration thereof is unaffected.

The flow meter may be introduced into the wellbore at any time. In one or more embodiments, the flow meter may be mounted to a portion of the production tubing before the production tubing is introduced into the wellbore. In one or more embodiments, the flow meter may be mounted to a portion of the production tubing in situ before construction of the isolated portion of the wellbore annulus is complete. In one or more embodiments, the flow meter may be mounted to a portion of the production tubing in situ after construction of the isolated portion of the wellbore annulus is complete. The flow meter sensor can be deployed in a new well with a new downhole smart completion, or as a retrofit in an old well as part of a retrievable system. For example, the flow meter sensor can be part of a testing chamber that can be deployed with coiled tubing, or as part of a completion in a new well architecture.

The flow meter may be mounted to the production tubing using well-appreciated technologies and techniques. In one or more embodiments, the flow meter is connected to the exterior surface of the production tubing. In one or more embodiments, the flow meter is coupled to the exterior surface of the production tubing. In any case, the outlet flow orifice of the flow meter is in fluid alignment with the flow inlet of the production tubing such that formation fluid traversing from the flow meter may pass into the production tubing and be processed uphole.

In one or more embodiments, a mechanical mount may be utilized to couple the flow meter to the production tubing.

The mechanical mount may be utilized to permit the flow sensor to be selectively decoupled, such as by using a mechanical release, from the production tubing, for example, to be serviced without removing the entire production tubing. In one or more embodiments, the mechanical mount is connected to the flow meter and selectively mechanically couples to the exterior surface of the production tubing. In one or more embodiments, the mechanical mount is connected to the exterior surface of the production tubing and selectively mechanically couples to the flow meter.

In method 700, step 705 may include introducing the flow meter into a wellbore. The flow meter is introduced into the wellbore such that it is positioned in the wellbore where the isolated portion of the wellbore annulus is or will be constructed. In one or more embodiments, the flow meter is introduced mounted to a portion of the production tubing. In one or more embodiments, the flow meter is introduced not mounted to a portion of the production tubing. In such an unmounted introduction, part of the introduction step may also include mounting the flow meter to the exterior surface of the production tubing.

In method 700, step 707 may include introducing formation fluid into the flow meter. By introducing formation fluid into the flow meter, a formation fluid flow begins from outside of the flow meter, through a flow meter inlet flow orifice, through a meter fluid cavity, past a sensor head, and out of the flow meter through the outlet flow orifice. Upon passing from the flow meter, the formation fluid flows into the production tubing, where it is directed uphole to be produced.

In some instances, the formation fluid flow upon passing from the reservoir may also pass through a remainder of the isolated portion of the wellbore annulus, where it may intermix with previously passed formation fluid. This may increase the period from which the formation fluid takes to pass from the reservoir, through the flow meter, and into the production tubing.

In method 700, step 709 may include inducing a vibration to the sensor head of the flow meter. When a formation fluid flows through the outlet flow orifice and contacts the sensor head, the sensor head may vibrate at a frequency against the contacting formation fluid.

In one or more embodiments, a driving module may induce the vibration in the sensor head so as to vibrate in the presence of the formation fluid contacting the sensor head. In one or more embodiments, the sensor head may vibrate when AC power flows through a piezoelectric layer of the sensor head so as to vibrate in the presence of the formation fluid contacting the sensor head. In one or more embodiments, the sensor head may vibrate from contact with the flowing formation fluid past the sensor head.

Electrical power that causes the induced vibration may be introduced to the sensor head from a local source, such as a battery pack, or from a remote source, such as a power generator on the surface.

In method 700, step 711 may include detecting a formation fluid vibration frequency of the sensor head. The detected formation fluid vibration frequency is in the presence of the formation fluid flowing past and in contact with the sensor head. The sensing module detects the formation fluid vibration frequency of the sensor head and transmits a data signal associated with the detected formation fluid vibration frequency.

In one or more embodiments, a sensing module may detect the formation fluid vibration frequency of the sensor head. In one or more embodiments, a sensing module may detect the formation fluid vibration frequency by detecting the electric field within a piezoelectric layer of the sensor head.

In method 700, step 713 may include determining a formation fluid density. The formation fluid density may be determined from the associated detected formation fluid vibration frequency detected utilizing the flow meter.

In one or more embodiments, a computer processor in signal communications with the flow meter may be configured to determine the fluid density based upon pre-determined instructions stored in memory.

In one or more embodiments, a multiphase fluid density ($\rho_{multiphase}$) may be related to the detected formation fluid vibration frequency of the sensor head via Equation 1:

$$\rho_{multiphase} = C_1 + C_2 f + C_3 f^2 \qquad \text{Equation 1}$$

where f is the detected formation fluid vibration frequency and $C_1$, $C_2$, and $C_3$ are coefficients. In one or more embodiments, the coefficients $C_1$, $C_2$, and $C_3$ may be experimentally derived. The coefficients $C_1$, $C_2$, and $C_3$ may depend upon the geometry and configuration of the sensor head.

In method 700, step 715 may include determining a fractional composition of the formation fluid utilizing the fluid density previously determined.

In one or more embodiments, the computer processor as previously described in step 713 may be further utilized to determine the fractional composition.

In one or more embodiments, the method may include determining the fractional composition using the fluid density of the multiphase fluid. In such embodiments where the formation fluid is suspected or expected to be a two-phase mixture of hydrocarbon liquids and water, the multiphase fluid density ($\rho_{multiphase}$) may be equal to:

$$\rho_{multiphase} = \varphi_i \rho_{water} + (1-\varphi_i)\rho_{oil} \qquad \text{Equation 2}$$

where $\varphi_i$ is the water cut, $\rho_{water}$ is the density of water, and $\rho_{oil}$ is the density of the hydrocarbon liquids. Therefore, if the density of water ($\rho_{water}$) and the density of hydrocarbon liquids ($\rho_{oil}$) are known at the measured conditions (for example, temperature, pressure), the measured total fluid density ($\rho_{total}$) may be used to determine the water cut.

For a multiphase system with more than two components (for example, a water, oil, and gas system), the total density determined using the fluid flow sensor system may be combined with additional measurements to determine the fractional composition of each component.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

"Optionally" and all grammatical variations thereof as used refers to a subsequently described event or circumstance that may or may not occur. The description includes instances where the event or circumstance occurs and instances where it does not occur.

The term "substantially" and all grammatical variations thereof as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open-ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of" The words "comprise," "has," and "include" and all grammatical variations thereof are each intended to have an open, non-limiting meaning that does not exclude additional elements or steps.

What is claimed:

1. A flow meter, comprising:
a flow meter housing having a first side and a second side and a first end and a second end, the first side configured to mount to a flow conduit and defining an outlet flow orifice proximate to the first end, the second side defining an inlet flow orifice proximate to the second end, where the flow meter housing defines a meter flow cavity and where the flow meter housing is configured to permit a fluid to be introduced into the inlet flow orifice, flow through the meter flow cavity, and pass from the outlet flow orifice; and
a sensor head positioned proximate to the outlet flow orifice, where the sensor head is configured to vibrate at a frequency upon introduction of electrical power while in contact with a fluid, to detect the vibration frequency of the sensor head, and to transmit the detected vibration frequency, where the vibration frequency is associated with a density of the fluid.

2. The flow meter of claim 1, where the sensor head comprises a piezoelectric layer and an electrode.

3. The flow meter of claim 1, where the flow meter comprises a plurality of the sensor heads, where at least two are positioned across from one another proximate to the outlet flow orifice in the flow meter cavity.

4. The flow meter of claim 1, where the inlet flow orifice and the outlet flow orifice have the same configuration and dimension.

5. The flow meter of claim 1, where the first side and the second side are opposing surfaces.

6. The flow meter of claim 1, where the flow meter housing is configured as an elongated cuboid.

7. The flow meter of claim 1, where the flow meter housing is configured as a cylindrical annulus.

8. A system for detecting the density of a produced fluid, comprising:
a flow sensor of claim 1 mounted to a production tubing, where the flow sensor is positioned such that the outlet flow orifice is aligned with a fluid inlet of the production tubing;
a source of power in electrical communication with the flow sensor such that a sensor head of the flow sensor may be induced to vibrate at a vibration frequency while in contact with a fluid, where the vibration frequency is associated with a density of the fluid; and
a computer processor in signal communication with the flow sensor and configured to both receive a data signal from the sensor head of the flow sensor and to determine the associated density of the fluid in contact with the sensor head utilizing the data signal, where the computer processor is part of a computer system.

9. The system of claim 8, where the fluid inlet of the production tubing has the same configuration and dimension as the outlet flow orifice of the flow meter.

10. The system of claim 8, where the computer processor is part of a computer system configured to determine both the density and a fluid composition of the fluid in contact with the sensor head, where the fluid composition is determined utilizing the determined density.

11. A method for determining a fluid density of a fluid, comprising:
introducing the flow meter of claim 1 into a wellbore;
introducing a fluid into the flow meter, wherein the fluid is a production fluid;
inducing a vibration in a sensor head in the flow meter; and
detecting a vibration frequency of the sensor head.

12. The method of claim 11, further comprising mounting the flow meter to an exterior surface of a production tubing and introducing the flow meter of claim 1 into the wellbore mounted to the production tubing.

13. The method of claim 11, where the introduction of the flow meter includes positioning the flow meter into an isolated portion of a wellbore annulus of the wellbore.

14. The method of claim 11, further comprising calibrating the flow meter.

15. The method of claim 11, further comprising determining a density of the production fluid utilizing the detected vibration frequency of the sensor head.

16. The method of claim 15, further comprising determining a fractional fluid composition of the production fluid utilizing the determined density.

* * * * *